Sept. 20, 1960 B. F. TELLKAMP 2,953,764

GRID CONFIGURATION FOR FILM TYPE RESISTOR

Filed Jan. 20, 1958

INVENTOR.
BERNHARD F. TELLKAMP

BY Quarles, Fox, Seidel, Bateman & Hoar

ATTORNEYS

United States Patent Office 2,953,764
Patented Sept. 20, 1960

2,953,764

GRID CONFIGURATION FOR FILM TYPE RESISTOR

Bernhard F. Tellkamp, Muskego, Wis., assignor to Allen-Bradley Co., Milwaukee, Wis., a corporation of Wisconsin Filed Jan. 20, 1958, Ser. No. 709,875
3 Claims. (Cl. 338—309)

Figure 1:
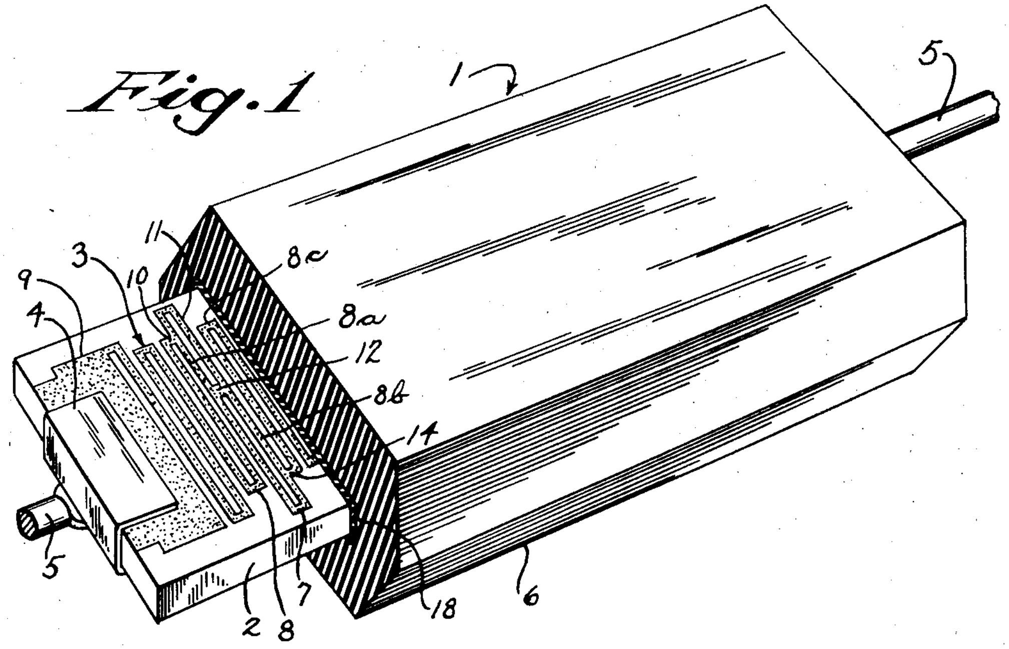

This invention relates to film type electrical resistors and methods of making the same, and it more particularly resides in a film of conductive material deposited on a base that has a principal conductive path with a plurality of alternate parallel conductive paths spaced successively along the principal path, such that selected alternate paths may be open circuited for adjustment of resistance value.

Precision electrical resistors of the metallic conductor type are extensively used as standards in electrical measuring apparatus, and in other apparatus requiring adherence to precise resistance values under load and adverse ambient conditions such as excessive moisture and high temperatures. In such resistors it is desirable, as an aid to manufacture, to be able to easily adjust the resistance to the value desired. For wire wound resistors, which have heretofore been extensively utilized for precision resistance applications, the manner of adjustment is not too complex. The length and diameter of wire necessary to obtain a desired resistance value may be calculated in advance, and then it is a relatively simple matter to wind this wire about a ceramic core. Accurate adjustment involves winding an excess and removing turns to the correct value by trial and error. Wire wound resistors are, however, objectionable for other reasons. They are relatively expensive to manufacture and usually are rather bulky and cumbersome. Their inductive and capacitor properties are also troublesome in some applications, and further, the difficulty of obtaining higher resistance values has limited their availability for values over 100,000 ohms, unless extremely small and fragile wire is used, or the size and cost are unduly increased.

Recently various deposited film type precision resistors have found favor as an advance over the wire wound resistors. One form of film type precision resistor comprises a substrate or insulating base of a high grade electrical glass upon which is deposited a metallic film in either a figurate or non-figurate pattern. Figurate patterns of narrow, sinuous lines that form an elongated current path are usually employed in order to obtain sufficiently high resistance values. The resistance of a conductive film is, of course, a function of the thickness of the film and the length and width of the path presented by the film, and variation of path length is a convenient manner of obtaining desired resistance values. Certain figurate patterns are also desirable because it is possible to cover a range of resistances by adjustment of the pattern after the film is deposited. Such adjustment is accomplished by blocking or cutting off portions of the pattern. Adjustment may also be made by varying the film thickness. This latter method of varying film thickness is available for obtaining approximate values, and precise values must be obtained by subsequent adjustment.

If it is desired to secure very substantial changes in resistance after the film is deposited, fairly extensive amounts of the figurate pattern must be removed from the resistor circuit. In the past, figurate patterns have been such that a removal of any extensive portion of a pattern would impair the resistor. Removal of such a portion would proportionately reduce the area available for heat dissipation. The efficiency of the resistor would therefore be impaired whenever the adjustment would be large. The percentage of total resistance value available for adjustment has not been large, and consequently it has been necessary to resort to a large number of figurate patterns to cover the wide range of resistance values necessary for a commercial product. Thus, each pattern has been for a predetermined resistance value, or has covered only a very limited range of values. The resulting burden of using a large number of patterns has necessarily raised costs of manufacture, and has adversely affected the usefulness of the film type resistor.

It is a teaching of this invention that film type electrical resistors, incorporating improved electrically resistive films in figurate patterns, can be made which are capable of accurate adjustment over a wide range of values, as measured in percentage of the total value. The conductive films may be deposited on insulating bases in accordance with practices heretofore employed, and overall size remains compact, so as to be adaptable for a variety of precision resistance applications. A particular teaching of the invention is a figurate pattern for the conductive film that provides for the even dissipation of heat over substantially the entire area of the resistor even though the amount of the pattern removed from the conductive path for purposes of adjustment is large.

The foregoing result rests upon the introduction of a number of current paths spaced successively along a principal conductive path that are in parallel with the principal path, but not in parallel with one another. Parallel current paths are disposed side by side and by cutting through one path of a parallel set adjustment is achieved without creating areas from which heat dissipation may no longer take place. A particularly convenient form of this successive paralleling of current paths is the presentation of two paths in parallel with an electrical intersection therebetween. One path to each side of the intersection may be provided with a loop exposed at the side of the pattern to present a point in the path that may be conveniently cut away to open circuit the path and thereby obtain an adjustment. The portions of the paths without the loops are referred to herein as the principal current path. The portions with loops are designated as alternate paths parallel to the principal path, and they are characterized by being spaced successively along the principal path, as distinguished from being parallel with one another.

By presenting a number of electrically parallel alternate branches, combinations thereof may be open circuited to adjust the total resistance to that value desired, and in this manner one figurate pattern will suffice for a wide range of resistance values. To complete a resistor terminals are connected to the ends of the path and a protective jacket is formed about the film and its insulating base. The conductive path describes a generally sinuous course, being preferably comprised of a plurality of closely spaced parallel transversely extending lines suitably interconnected to have each alternate path lie closely adjacent the principal path. The parallel paths then follow a like sinuous course.

It is a primary object of this invention to provide improved precision film type electrical resistors and methods of making the same.

It is also an object of this invention to provide a precision film type electrical resistor incorporating an electrical resistive film having an improved pattern so as to be accurately and simply adjusted to any one of a number of resistance values within a wide range.

It is a further object of the invention to provide a low cost, compact, film type electrical resistor having desirable heat dissipation properties.

A still further object of the invention is to provide a method of producing a precision film type electrical resistor in a simple inexpensive manner.

The foregoing and other objects and advantages of this invention will appear from the following description, in which description reference is made to the accompanying drawing which forms a part hereof, and in which there is shown by way of illustration and not of limitation one particular embodiment of the invention.

Figure 2:
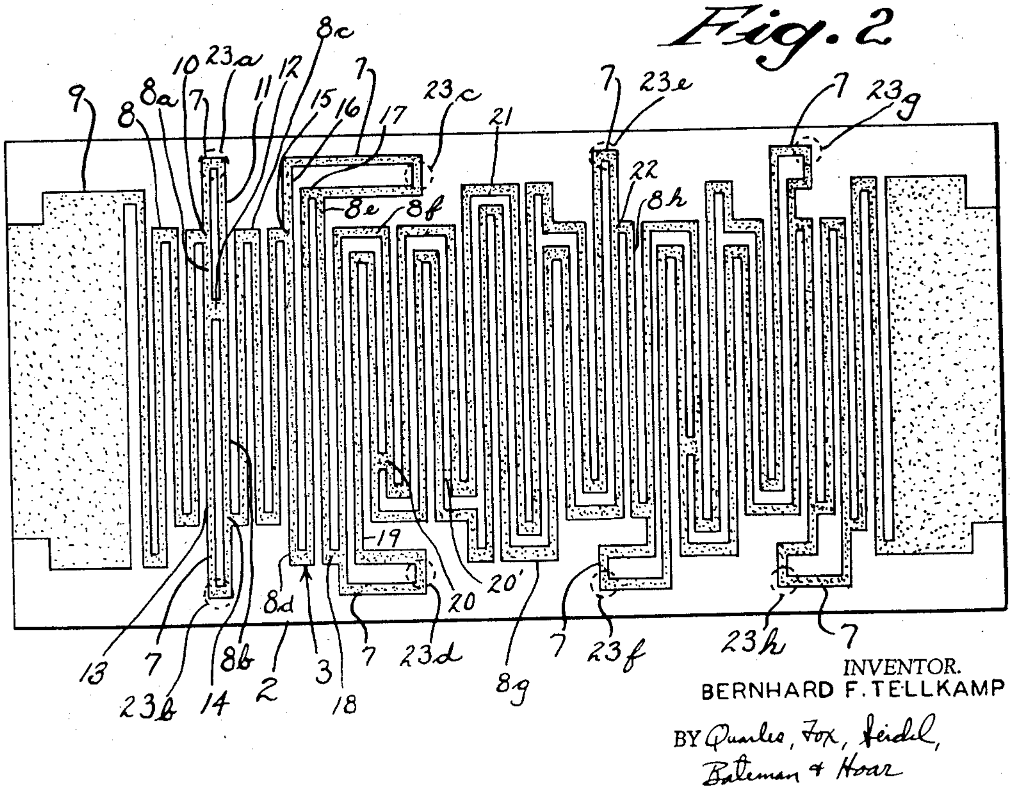

In the drawing:

Fig. 1 is a view in perspective of a film type electrical resistor embodying the present invention, a portion of the jacket of the resistor being cut away to expose a portion of an electrically resistive film and the base upon which such film is deposited, and Fig. 2 is a plan view of the base and electrically resistive film of the resistor of Fig. 1.

Referring now to Fig. 1, a preferred embodiment of an electrical film type resistor constructed in accordance with the present invention is shown. The electrical resistor includes an electrically non-conductive solid base 2, an electrically conductive deposited film 3 disposed in an improved figurate pattern on one surface of the base 2, electrical terminals 4 disposed at opposite ends of the base 2 which are electrically connected to opposite ends of the film 3, a terminal lead 5 connected to each terminal 4, and a protective jacket 6 enclosing the base 2, film 3, and terminals 4 which leaves the terminal leads 5 exposed. Base 2 has a small, relatively thin, rectangular configuration, and for a one watt resistor need not exceed about one inch in length. Base 2 should be of a material having requisite electrical and chemical stability so as not to adversely affect the resistance value of the film 3 under load. Moreover, the material should readily accept the deposited film 3 and have a compatible temperature co-efficient to preclude rupture of the film 3 with temperature change. The base 2 is preferably of a low ionic content electrical glass, and one particular glass that is satisfactory is lead alkali silicate electrical glass.

The film 3 is preferably a metallic deposit suitable for high grade precision resistors, such as a deposit of chromium or chromium and nickel, or a noble metal alloy. Non-metallic material may also be employed in the practice of the invention. The film 3 may be deposited in any suitable manner. A preferred procedure is a vapor deposition process in which metal to be deposited on the base 2 is heated in an evacuated enclosure to vaporizing temperatures. The base 2 is placed within the enclosure at a position in the path of travel of the vaporized metallic particles, and as the particles strike the base 2 the film is developed to the thickness desired. To obtain a figurate pattern for the film 3, such as shown in Figs. 1 and 2, the base 2 is first coated with a suitable masking material for example, a photosensitive resist, which contains a gelatin that may be photosensitively insolubilized by inclusion of a substance such as an alkali dichromate. A suitable resist for this purpose is a photoengraver's resist. A photographic negative of the figurate pattern is prepared from a carefully prepared drawing several times the size of the final pattern on the base 2. The photosensitized resist is then exposed through the negative to a strong light to render the areas struck by light insoluble. The unexposed portions are then washed away to bare the underlying base 2, and in this manner the figurate pattern is transferred to the resist. The base 2 is now ready for the vapor deposition of the metallic film, which will cover both the resist and the areas from which the resist has been washed.

After deposition of the film 3 the resist, together with the metal deposited thereon, are removed. A suitable solvent, as for example, an alkaline solution which attacks the gelatin may be employed. After this treatment the final figurate pattern of the deposited film 3 is left exposed on the base 2. The thickness of the film 3 deposited in accordance with the foregoing procedure may be suitably varied, to provide a variety of desired resistance values, which will be further adjusted in the manner herein described. In commercial practice the pattern will be repeated several times on a single glass sheet, and after the deposition process is fully completed to leave the patterns exposed on the glass, the individual bases 2 will be separated from one another.

Film 3, as shown in Figs. 1 and 2, is in the form of a pattern of closely spaced, generally parallel lines disposed generally transversely of the base 2. The lines are interconnected to form a principal conductive path extending through the length of the film 3 from one end of the base 2 to the opposite end. A plurality of alternate conductive paths are also presented, and these are spaced successively along the principal path. At least a portion of each alternate path is in the form of a loop 7 which lies on the side margin of the overall pattern. The alternate paths are arranged so that some of the loops 7 lie at one side of film 3, while some of the loops 7 lie at the opposite side of film 3, as clearly seen in Fig. 2. Thus, there are several loops 7 spaced along each side of the film 3, and due to the interconnection between the principal and alternate paths, any number of loops 7 can be severed while still providing a complete conductive path through film 3. As will be noted from Fig. 2, the paths associated with the various loops 7 differ in length so that the resistance of film 3 can be varied within wide limits by severing one or more selected loops 7 to eliminate one or more selected alternate paths from the circuit. If desired, the alternate paths can all be constituted of identical length, and also any suitable number of alternate paths having the desired loops 7 at the margins of the pattern of the film 3 may be employed.

Referring specifically to Fig. 2, the course of the principal path of the film 3 will be partially traced to exemplify the character of the principal and alternate paths. Commencing at the left hand side of Fig. 2, the principal path departs in a thin line, or pathway, 8 from a terminal zone 9. The pathway 8 extends to a junction 10, from which two branches depart. One branch **8*a* is a continuation of the principal path 8, and the other branch 11 constitutes an alternate path including a loop 7 exposed at the side. The alternate path, or branch, 11 rejoins the principal path 8*a* at a four way intersection 12, and hence forms a parallel path extending along a portion of the principal path 8*a***.

From the intersection 12 the principal path departs in a thin line **8*b* and a second alternate path 13 also departs from the intersection 12. The alternate path 13 includes a loop 7, and rejoins the principal path 8*b* at a junction 14, so as to form a parallel path extending along a portion of the principal path 8 beyond that paralleled by the alternate path 11. From the junction 14 the principal path extends in a line 8*c* to a subsequent junction 15. At the junction 15 another parallel, alternate path 16 branches from the principal path which continues along the line 8*d*. Paths 8*d* and 16 rejoin at junction point 17, from which the principal path extends in a single line 8*e* to a junction point 18**.

At the junction point 18 the current path divides into parallel pathways **8*f* and 19 which extend alongside one another to a four way intersection 20. Pathway 19 includes a loop 7 and pathway 8*f* does not. From the intersection 20 the parallel pathways continue in a side by side sinuous manner, and in Fig. 2, the continuation of pathway 8*f* is designated as pathway 21 and the continuation of pathway 19 is designated as pathway 8*g*. It will be observed that pathway 21 includes a loop 7, while pathway 8*g* does not. Pathways 21 and 8*g* reconvene at a junction point 22, from which the principal path continues along a thin conductive line 8*h***. In a similar manner the principal path 8 continues through the remainder of the pattern, with additional successive parallel paths first departing from and then reuniting therewith.

After the film 3 has been deposited in the figurate pattern shown, and the masking resist material has been removed, the value of the resistance can be adjusted. The adjustment procedure comprises severing one or more of the loops 7, as for example, by removal of the film at one or more of the dotted areas 23*a*, 23*b*, 23*c*, 23*d*, 23*e*, 23*f*, 23*g* and 23*h*. By severing loop 7 an alternate parallel conductive path is open circuited, and the total resistance presented by the film 3 is increased. Hence adjustment is made by incremental increases in resistance. Any number of loops 7 can be severed without interrupting the continuous path 8 through the film 3, since, as described, the loops 7 lie entirely in alternate parallel paths.

It will be noted that since the loops 7 are spaced apart and at the margins of the film 3, the operation of severing one or more loops 7 can be carried out very easily and conveniently with a minimum of handling, and with a minimum danger of exposing the film 3 to injurious cuts or abrasions. One method of disrupting the desired loops 7 comprises placing the base 2 in a suitably shaped jig having a set of power drills, each drill being poised above a loop 7. The jig may be arranged so that one or more selected drills can be simultaneously depressed and brought into contact with the selected loop, or loops, 7 so as to sever the loops by cutting away a small area of the metallic film 3.

The change in electrical resistance of film 3 by cutting through or otherwise severing a loop 7 will necessarily depend upon the difference between the resistance afforded by the parallel paths presented before cutting and the resistance of the principal path standing alone after cutting. Also, the percentage change in resistance, incurred by severing a loop 7, will depend upon the order in which the loops are severed. This is demonstrated by the following table, in which are listed the changes in resistance afforded by severing each loop 7 either first or last in a succession of severances that includes all the loops 7. The designation of the points of severance of the loops 7 in the table is identical with those illustrated in Fig. 2, and the percentage change for a severance is, of course, applicable only to the particular pattern configuration shown in Fig. 2. For other patterns, in which the relative lengths of the alternate parallel paths are different, the percent changes will be correspondingly different.

*Table*

| Loops 7—Position of Cut | Percentage Increase in Resistance | Sequence of Cutting |
|---|---|---|
| 23*a* | .23 | first loop cut. |
| | .17 | last loop cut. |
| 23*b* | 1.10 | first loop cut. |
| | .75 | last loop cut. |
| 23*c* | 7.53 | first loop cut. |
| | 5.32 | last loop cut. |
| 23*d* | 3.94 | first loop cut. |
| | 2.74 | last loop cut. |
| 23*e* | 17.51 | first loop cut. |
| | 12.88 | last loop cut. |
| 23*f* | 3.54 | first loop cut. |
| | 2.41 | last loop cut. |
| 23*g* | 7.03 | first loop cut. |
| | 5.00 | last loop cut. |
| 23*h* | 6.42 | first loop cut. |
| | 4.65 | last loop cut. |

The table indicates that a severance at position 23*a*, which position is in pathway 11, produces the smallest percentage change, namely .23 percent if it is the first severance made, or .17 percent if it is the last severance after all other loops 7 have been severed. The largest percentage change is obtained by severing at position 23*e*, which lies in pathway 21, and by severing all the loops 7 a change greater than forty percent is achieved. Thus, the figurate pattern can be used for a wide range of resistance values.

An important advantage is inherent in film 3 when deposited in the form of the improved pattern shown in Figs. 1 and 2. Heat dissipation, due to resistance drop in the resistor 1, takes place throughout the entire length of the principal path 8 of film 3. This result is present regardless of how many, or which, loops 7 are severed in adjusting the resistance of the film 3. Accordingly, generally even and rapid heat dissipation along the entire length of the resistor is provided, whereby maximum efficiency is obtained and enhanced power ratings may be attributed to resistors of the invention. The temperature gradient over the entire area of the base 2 will be small, and without abrupt change from high to low temperatures, so that the thermally induced stresses in the base 2 will be minimal.

Although the preceding discussion has been in reference to the figurate pattern of the film 3 illustrated in Figs. 1 and 2, it will be obvious that film 3 may take other suitable figurate patterns in accordance with the teachings of the present invention. Accordingly, modifications can be made in the figurate pattern of Fig. 2 with respect to the number, shape, size and location of the loops 7, and also with respect to the particular configuration of the principal and alternate paths that comprise the film 3. For example, the figurate pattern of Figs. 1 and 2 may be modified so as to secure another suitable range of resistance values from that of the pattern of Figs. 1 and 2. Through a selection of a very few patterns, the entire range of commercial resistance values may thus be covered. By utilizing the wide latitude of resistance values that may be had from one film, through the practice of the invention, and by varying film thickness, a single pattern suffices to cover a very extensive resistance range.

After film 3 has been adjusted to the desired resistance value, the base 2 together with the deposited film 3, the terminals 4, and the inner ends of the terminal leads 5 are preferably encapsulated in the protective jacket 6. Jacket 6 may comprise any suitable thermosetting material or ceramic composition which is durable and has both high dielectric and structural strengths. Jacket 6 should also be able to withstand substantial heat without degradation, and other desirable properties are dimensional stability and moisture resistance. Epoxy resins have been found satisfactory for use in forming the jacket 6 and known procedures may be used for forming the resin about the base 2. For example, the base 2 with its film 3 may be suspended by the terminal leads 5 within a cavity that acts as a form into which viscous resin is poured and then cured in situ to a solid. Illustrative of this procedure is the selection of a liquid epoxy resin of about 350–420 molecular weight, which is mixed with a suitable amount (about 14 parts per 100 parts resin) of a catalyst, such as m-phenylene-diamine. The mixture is placed in a form in which the resistor is suspended by means of the leads 5. The resin mixture is then poured and cured for about 2 hours at about 175° F., after which the temperature is increased to 350° F. and maintaind for about 1 hour, until the resin is fully cured to a solid state. A durable moisture resistant casing is thereby obtained which tightly encloses the base 2 and film 3.

It has been found desirable to first apply an elastic coating 18 to the surface of the base 2 before encapsulating with the jacket 6. The purpose of the elastic coating 18, is to provide a bedding of moisture impervious material that will relieve the film 3 of mechanical stresses that might otherwise arise by reason of shrinkage of the jacket 6 as it cures, or by reason of unlike temperature coefficients of expansion of the materials. The elasticity reduces internal stresses, and the coating 18 should also be heat resistant and a non-conductive insulating material of high dielectric strength. Silicone rubber compounds have been found to be particularly suitable for the purposes intended. Such compounds are known and comprise silicones or siloxanes of such structures and molecular weights as to have the properties and characteristics of a rubber. They are stable at temperatures as high as 300° C., and remain elastic at temperatures as low as —55° C. so that resistors including a coating 18 may be used in a wide variety of applications.

The manner of applying the elastic coating 18 will necessarily depend on the particular materials selected. Many of the silicone rubber compounds are self-vulcanizing at low temperatures and, accordingly, can be conveniently applied and vulcanized on the base 2 and film 3, without complex processing equipment.

The precision film type electrical resistor of the present invention may be adjusted to a desired resistance value in a simple and inexpensive manner, thereby enhancing the desirability of the film type resistor. Precision adjustment can be made, for any given figurate pattern, to any one of a large number of predetermined resistance values within a wide range. Also, adjustments do not impair heat dissipating characteristics, for the entire length of the conductive path extending across substantially the entire area of the base is utilized at all times. Adjustments as great as fifty percent of unadjusted value may be made without substantial alteration in the distribution of the evolved heat.

The amounts of adjustment secured by severing any of the loops 7 may be modified by changing the location of junctions, such as 10, 14, 15, 17, 18 and 22, or by moving the intersections, such as 12 and 20, along the parallel pathways that they join. The provision of intersections is of particular aid in achieving flexibility in calibration of the resistor. An intersection, such as 20, lies between two parallel conductive paths, which extend in parallel relation to both sides of the intersection. Thus, parallel pathways 8*g* and 21 extend to the right of intersection 20 and pathways 8*f* and 19 extend to the other side of intersection 20. One pathway to each side of the intersection 20 is provided with a severance loop 7, and thus calibration can be carried out to both sides of the intersection. Consequently, by moving the intersection to some other position between the parallel paths, such as to the location 20′ shown in dotted lines, the percentage change obtained by severing an associated loop 7 is altered. In this manner differing calibration steps can be achieved.

The position of the intersections, such as 20, can be readily selected when developing the photographic negative from which the figurate pattern is transferred to the photosensitive resist. The drawing that is photographed to produce the negative does not include the intersections as a part thereof, but instead small rectangular overlays representing the intersections are laid upon the drawing preparatory to taking the photo. The positions of the rectangular overlays then determine the final intersection positions, and one figure pattern will suffice for a variety of calibration percentages.

I claim:

1. In an electrical resistor having a film of conductive material disposed on a base, a configuration for the film which comprises a plurality of parallel lines on the base extending between opposite margin areas; a crossover path between two adjacent parallel lines; a first set of end connections to one side of the crossover path joining the lines to such side into a principal path and an alternate path in which such paths parallel one another in a sinuous configuration extending between opposite margin areas; a second set of end connections to the opposite side of the crossover path joining the lines to such side into a continuation of said principal path and a second alternate path in which such paths parallel one another in a sinuous configuration; and each of said alternate paths having loops in a margin area.

2. In an electrical resistor having a conductive material disposed on a base, a configuration for the material which comprises a principal pathway extending from one end of the base to the other which is in the form of a narrow line of sinuous configuration that extends back and forth across the base; and a number of alternate paths each connected at its ends in electrical parallel arrangement with the principal pathway, such alternate paths being spaced successively along the principal path with portions thereof extending across the base and lying between the crosswise portions of the principal pathway so as to be interdigited therewith, and said alternate paths being of varying length with at least one thereof paralleling no less than ten percent of the principal pathway and having a resistance of the same order of magnitude as that of the principal pathway portion which it parallels.

3. The method of making a film type resistor comprising making a drawing of the configuration of the pattern which the conductive paths of the resistor are to take, which pattern includes electrically parallel paths disposed side by side; placing an overlay on the drawing which joins the parallel paths to represent an electrical crossover; photographing the drawing and overlay and developing a negative; placing a photosensitive resist on an insulating base; transferring the configurate pattern of the negative to the resist and washing away insolubilized resist to expose portions of the base corresponding to the configurate pattern; depositing a metal film on the resist and base; and removing the resist together with the film thereon.

References Cited in the file of this patent

UNITED STATES PATENTS

| | | |
|---|---|---|
| 2,261,667 | Stroszeck | Nov. 4, 1941 |
| 2,641,675 | Hannahs | June 9, 1953 |
| 2,682,596 | Cox et al. | June 29, 1954 |
| 2,849,583 | Pritikin | Aug. 26, 1958 |

FOREIGN PATENTS

| | | |
|---|---|---|
| 461,275 | Great Britain | Feb. 15,1937 |